United States Patent [19]

Schaefer et al.

[11] Patent Number: 4,502,234

[45] Date of Patent: Mar. 5, 1985

[54] SYNTHETIC-RESIN BODY SUPPORT MATERIAL

[75] Inventors: Helmut Schaefer, Cerro Maggiore, Italy; Philipp Schaefer, Hanover, Fed. Rep. of Germany

[73] Assignee: Secans AG, Zug, Switzerland

[21] Appl. No.: 402,597

[22] Filed: Jul. 28, 1982

[30] Foreign Application Priority Data

Jul. 29, 1981 [DE] Fed. Rep. of Germany ....... 3129888

[51] Int. Cl.$^3$ .......................... B32B 3/02; B32B 3/12; B32B 5/22
[52] U.S. Cl. ....................... 36/28; 36/30 R; 428/159; 428/160; 428/240; 428/246; 428/283; 428/286; 428/313.5; 428/316.6; 428/85; 428/905
[58] Field of Search ................. 521/54; 36/28, 30 R; 428/71, 76, 314.4, 314.8, 316.6, 313.5, 85, 159, 240, 160, 246, 283, 286, 905

[56] References Cited

U.S. PATENT DOCUMENTS

| | | | |
|---|---|---|---|
| 3,355,535 | 11/1967 | Hain et al. | 428/316.6 |
| 4,108,928 | 8/1978 | Swan, Jr. | 428/313.5 |
| 4,128,950 | 12/1978 | Bowerman et al. | 36/30 R |
| 4,228,600 | 10/1980 | Krug et al. | 36/30 R |
| 4,430,448 | 2/1984 | Schaefer et al. | 521/54 |

Primary Examiner—William J. Van Balen
Attorney, Agent, or Firm—Karl F. Ross; Herbert Dubno

[57] ABSTRACT

A foamed material, which is adapting under pressure to the shape of parts, particularly of parts of the human body, but which on pressure relief again returns to a vast extent and after a certain restoring time into the original shape, consists of the following constituents:
(a) substantially saturated liquid hydrocarbons;
(b) unsaturated liquid hydrocarbons, preferably polybutadiene;
(c) a reactive agent, preferably polyisocyanate, with which the unsaturated liquid hydrocarbons are reacted;
(d) a cross-linking agent, for example ethylene hexane diol;
(e) hollow microspheres, the thin shell of which consists of vinylidene chloride copolymer and the interior of which contains a gas.

The production of such a foamed material is preferably such that the substantially saturated liquid hydrocarbons and the unsaturated hydrocarbons are intermixed, noting that particles consisting of a vinylidene chloride copolymer and containing an inflating agent are added to this mixture or to a constituent of this mixture, and noting that the mixture is, prior or after this addition, heated to a temperature between 92° C. and 165° C. and preferably 105° C., so that hollow microspheres are formed in situ, and that subsequently the cross-linking agent is added and that finally, after optionally adding a catalyst, the mixture is combined with the reactive agent and intensely mixed, whereupon the mixture is filled into a mold and allowed to react.

31 Claims, 1 Drawing Figure

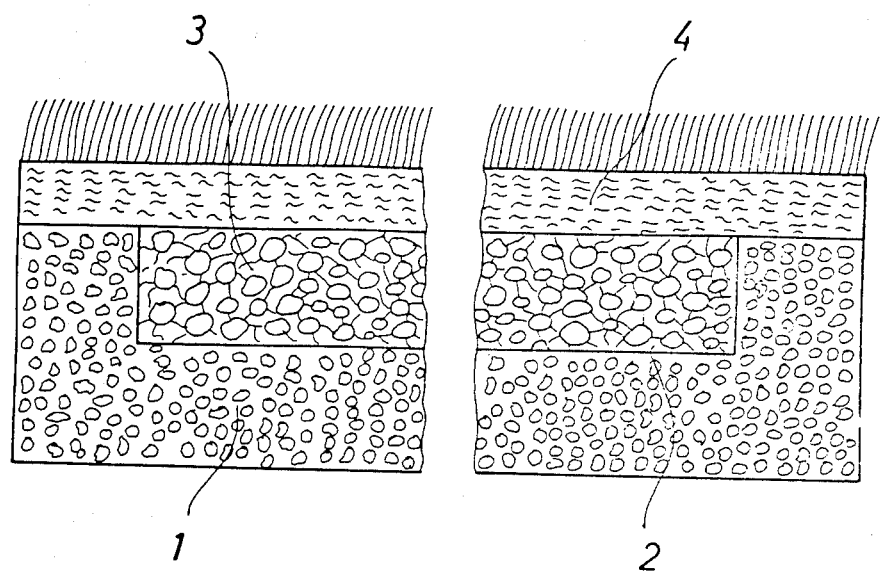

SYNTHETIC-RESIN BODY SUPPORT MATERIAL

FIELD OF THE INVENTION

The invention relates to a foamed plastics (synthetic resin) material, for support, e.g. of parts of the human body. The invention also relates to a process for producing foamed plastics material.

BACKGROUND OF THE INVENTION

There are already known cushions comprising a filling of a foam-like mass of synthetic plastics material, said mass being adaptable to the shape of a part to be supported, in particular to a body portion to be supported. In a known cushion of this type the foamed material is arranged in a thin envelope of sheet material, for example a fabric, and consists of thermoplastic hollow microspheres which are mutually interconnected in a separable manner by means of a small amount of a pasty substance or of a substance in the form of a liquid at body temperature. The foamed material has a very low density of 0.02 to 0.3. Such known cushions are particularly suitable in the fields of application in which the shape adapted to the body portions remains unchanged also in future as is, for example, the case with ski boots which are always worn by the same person. If it is, however, required to adapt cushions having already a certain shape to another body portion, these cushions must, because they have no elastic properties with respect to tension forces, be brought into their original shape prior to adaptation to the other body portion.

There are also known cushions for shoes or boots and having a thixotropic mass or a mass of high viscosity, for example an oil having incorporated therein silicates or a liquid synthetic plastics material, filled into an envelope, for example a sheet of polyvinyl chloride. These cushions have plastic properties and are well capable of becoming shaped under pressure to shape of the parts to be supported but are heavy and have no elastic properties with respect to pressure and tension forces and thus lack the desired supporting comfort. Furthermore, the deformed cushions do not restore their original shape without the action of external forces and for changing their shape the action of an external force is required.

In another known cushion the filling consists of thermoplastic hollow microspheres which are mutually interconnected in an inseparable and elastic manner by means of a polysulfide or a polysiloxane. These cushions become adapted to a certain shape of the body only under a high dynamic pressure and can thus be used in an optimum manner only in such cases in which a high pressure acts on a small surface as is for example the case with orthopaedic supports or with crutches; the cushion and this remains elastic with respect to pressure forces after any adaptation.

OBJECTS OF THE INVENTION

It is an object of the present invention to provide a foamed material for supporting of parts which is capable to completely adapt to a given body shape even under low pressure, to act on the respective part—after having been adapted—with only low and non-disturbing relaxation pressures and to automatically restore its original shape whenever the pressure exerted by this part ceases acting, i.e. after removing this part, without having to be manually brought into its original shape.

It is a further object of the present invention to provide a foamed material which can be used with particular advantage for supporting portions of the human body because this foamed material becomes rapidly adapted to the portions of the human body even under a low pressure exerted on the foamed material by these portions of the human body, acts on these portions of the human body—after having become adapted as to shape—with an only low and thus non-disturbing pressure and automatically restores its original shape after having been pressure-released.

It is a particular object of the present invention to provide a foamed material which can be used as a filling mass for mattresses, particularly for anti-decubitus-supports, for comfortably supporting lying patients and for protecting same from becoming injured when lying.

Still another object is to provide a foamed material which can also be used as a filling mass for cushions, for example for crash helmets, shoes and particularly ski boots, seat upholstery, for example for office chairs, vehicle seats and sick chairs, and which. The foamed material according to can also be used as a rear cladding for dental prostheses.

It is a further object of the invention to provide a foamed material having both plastic and elastic properties and providing the opportunity to make the desired use of the advantages of these properties without allowing the disadvantages to become effective.

It is an object of the invention to produce a foamed material which behaves on normally occurring temperatures, i.e. preferably room temperatures, and on acting pressure forces in a similar manner as a very soft rubber and which thus reliably supports in a highly elastic manner the respective parts and which is capable of becoming adapted to the shape of the respective parts and which—after having become deformed—behaves passively with respect to tension and pressure forces so that no noticeable restoring force, which is considered uncomfortable, acts on the parts to be supported.

It is a further object of the invention to produce a foamed material which has a low density and thus a low weight.

Finally, it is an object of the invention to produce a foamed material showing a certain self-adhesive property which can be used for fixing the foamed material or, respectively, a cushion formed of this foamed material and lacking a cover layer on at least one side—without additional measures—onto a surface, for example on the inner side of a crash helmet or a ski boot comprising a rigid shell.

DESCRIPTION OF THE INVENTION AND EXAMPLES

Example 1

100 parts by weight of an hydroxy-terminal polybutadiene of the designation "Poly bd R45HT" are added to and mixed with 104 parts by weight polyisobutylene having a molecular weight of approximately 3000 and containing 5 parts by weight of hollow microspheres having a thin shell of a vinylidene chloride copolymer and having been produced within the polyisobutylene at a temperature of 105° C. from compact particles containing an inflating agent. Subsequently, 3 parts by weight ethylene hexane diol acting as a cross linking agent and 0.8 part by weight "Dabco DC2" acting as a catalyst are added to this formulation and distributed therein. 100 g of this mixture are combined with 12 g polyisocyanate "Desmodur PF" and intensely mixed during some seconds. After approximately 5 minutes standing at room temperature there is formed from the mass, which is liquid immediately after mixing, a kneadable mass having plastic and elastic properties, a density of 0.5, a Shore A hardness of about 2 and an elongation at fracture of 750%.

Example 2

100 parts by weight polybutadiene of the designation "Poly bd R45HT" are mixed with 75 parts by weight mineral oil and with 5 parts by weight ready-made dry hollow microspheres comprising a thin shell of a vinylidene chloride copolymer as well as with 3 parts by weight ethylene hexane diol and 0.7 parts by weight "Dabco DC2" acting as a catalyst. 100 g of this mixture are intensely mixed with 15 g of the polyisocyanate "Desmodur PF". Approximately 4 minutes later the liquid foam-like mass solidifies to assume plastic and elastic property. The mass has a density of about 0.5, a Shore A hardness of approximately 5 and an elongation at fracture of more than 700%.

Polybutadiene of the type "Poly bd R45HT" can be obtained from the firm Metallgesellschaft AG in Frankfurt on Main. Polyisocyanate "Desmodur PF" can be obtained from the firm Bayer AG in Leverkusen.

The catalyst "Dabco DC2" can be obtained from the firm Hüls-Chemische Fabriken in Marl (West Germany).

The compact particles, from which the hollow microspheres are produced, can be obtained under the designation "Expacel" from the firm Kema-Nord in Sundvall (Sweden).

In general, the foamed material according to the invention has a density of about 0.20 to 0.85, an elongation at fracture of more than 420% and a Shore A-hardness of 1 to 25. Even at a pressure of less than 1N per 1 $cm^2$ the foamed material becomes deformed within 1 minute by essentially laterally yielding, i.e. cold flow, and becomes adapted to the parts to be supported. After the deformation pressure ceases acting, a very low and scarcely measurable pressure is sufficient to maintain the foamed material in its assumed shape. After complete pressure release, the foamed material gradually and completely or nearly completely returns into its original shape. The restoring velocity is substantially dependent on the proportion of the substantially saturated hydrocarbons. The greater is this proportion the better are the plastic properties of the foamed materials and the slower is the restoring movement and, respectively, the greater is the remaining degree of deformation which is not removed after complete pressure release. Conveniently the ratio between the proportion of substantially saturated hydrocarbons to the proportion of unsaturated hydrocarbons is between 2.5:1 and 1:3, preferably 1:1. A proportion of less than 50% of substantially saturated hydrocarbons is not recommendable.

Various suitable materials, for example substantially saturated mineral oils, can be used as saturated hydrocarbons. However, the substantially saturated liquid hydrocarbons conveniently consist of a polyisobutylene, namely of a polyisobutylene having a low molecular weight between 500 and 15 000. Such a polyisobutylene is well suited for being mixed with the substantially unsaturated liquid hydrocarbons, preferably a polybutadiene, becomes not segregated after the mixing or stirring operation and scarcely reacts with the NCO-groups of the polyisocyanate representing the reactive agent. Also other substantially saturated liquid hydrocarbons, and their chemical compounds, being chemically inert with respect to the polyisocyanate can be used. These substantially saturated liquid hydrocarbons contribute to a wide-meshed cross linking of the polybutadiene without migrating or bleeding from the finished mass. For this reason, the inventive mass has the mentioned favorable properties and is plastic as well as elastic in behavior.

The hollow microspheres, forming a component of the foamed material, advantageously have a diameter between 0.01 to 0.1 mm. These hollow microspheres, the thin shell of which consists of a vinylidene chloride copolymer and the interior of which contains a gas, are inert with respect to the polyisocyanate representing the reactive agent and with respect to the unsaturated liquid hydrocarbon and substantially improve the passive properties of the foamed material with respect to tension forces and pressure forces.

Within the polybutadiene being cross linked in a wide-meshed manner by means of the polyisocyanate and a cross-linking agent, for example ethylene hexanediol, there are chemically quasi-uncombined not only the substantially saturated liquid hydrocarbon but also the hollow microspheres because both are not or scarcely participating in the construction of the molecular structure of the foamed material. The substantially saturated hydrocarbons as well as the hollow microspheres are thus inactive with respect to the molecular function but their influence on the properties of the inventive foamed material is important and they represent, in spite of being incorporated within the foamed material in a quasi-uncombined manner, a firmly integrated component of this foamed material and are incapable of evading.

The inventive foamed material exclusively has closed cells and behaves rather more thermo-elastically than thermoplastically, which means that the properties of the foamed material are nearly the same within a broad range of temperatures. This enables sterilization by means of heat of cushions filled with this foamed material, as is, for example, required for anti-Decubitus-supports.

The hollow microspheres further substantially reduce the density of a foamed material according to the invention. This density is in the range between 0.20 and 0.85, preferably between 0.35 and 0.55. The hollow microspheres, which are elastic with respect to pressure forces, further prevent glueing of the cells on compression.

The properties of a foamed material according to the invention can further be improved if the mass additionally contains filler materials, for example perfumes, pigments and/or stabilizers.

Advantageously, the foamed material according to the invention has a composition which provides adhesive properties of the foamed material. The foamed material then has a certain self-adhesive property which can be used for fixing, without additional measures, the foamed material or, respectively, a cushion formed of this foamed material and lacking a cover layer on at least one side to a predetermined area. A contact glue is provided in this manner which is, as a rule, sufficient for connecting the inner upholstery of a crash helmet or of a ski boot with the rigid shell.

It is not necessary that the foamed material according to the invention be enclosed within an envelope. The foamed material is used without any envelope when being, for example, used for cladding of dental prostheses. In other fields of application it is, however, of advantage if a layer, for example of foamed polyethylene, foamed polyurethane, a textile or a natural or artificial fur, or a sheet or foil, for example of polyethylene, is applied to at least one side of the foamed material. A cover layer on the foamed material is convenient at least for that side of the foamed material which is in contact with the part to be supported.

Although the foamed material according to the invention is kneadable under low pressure, this foamed material has such an internal cohesiveness that it does not migrate through a cover layer consisting of a textile material or of a natural or artificial fur. The use of a textile material or, respectively, of a fur for the cover layer is of substantial advantage over the use of foils of synthetic plastics material because such foils of synthetic plastics material have bad hygienic properties.

It is also possible that the foamed material according to the invention is at least partially covered by a shaped body which can preferably consist of an elastomeric foam, for example of a polyurethane foam or of a polyethylene foam. The cover layer as well as the shaped body can represent the sole of a shoe or at least part of a sole of a shoe, in particular an inlay sole or a welt. In this case, the foamed material according to the invention is preferably provided at the ball portion and at the heel portion of the shoe. Of course, it is also possible that the foamed material according to the invention extends over the whole bottom side of the sole.

The foamed material according to the invention acts, in this case, as a shock absorber. Such soles are preferably used for sporting shoes and contribute on account of the damping and passive properties of the foamed material to avoid injuries of joints, the foamed material becoming adapted to the shape of the foot at those areas of the foot which, as is the case with the heel and the ball, are subjected to particular stress. If the foamed material according to the invention is arranged on the bottom side of a sole consisting of foamed polyethylene it is prevented that the extremely light-weight but easily compressible polyethylene foam becomes compressed at the areas of particularly high pressure stress to such an extent that the foot is no longer elastically supported.

If the foamed material according to the invention is arranged within a recess of a shaped body, which shaped body forms a sole, it is of advantage if the foamed material extends somewhat above the top surface of the sole. This will guarantee that the pressure exerted by the foot on the foamed material correspondingly deforms the foamed material, which becomes adapted to the shape of the foot at the respective areas, so that an optimum supporting action is achieved.

The foamed material according to the invention can be connected with the cover layer and, respectively, with the shaped body by glueing, although another type of connection can equally be provided. In particular, it is possible to place the cover layer into a mold prior to introducing into this mold the mentioned mixture which then is allowed to react. In this case, the cover layer is firmly connected with the foamed material already when producing same. A further advantage resulting from such procedure consists in that it is not required to introduce into the mold a separating agent facilitating removal of the product from the mold.

If the foamed material according to the invention is received by recesses of a shaped body, these recesses can already be used as the mold. The procedure can, however, also be such that the inventive foamed material, which has already been prefabricated and been given the desired shape, is inserted into a mold corresponding in the dimensions to the shaped body and that subsequently that material is introduced into the remaining space of the mold which forms the shaped body, i.e. for example a polyurethane-forming material or polyethylene. This material becomes inflated within the mold and the foam formed snugly encloses the inventive foam material and becomes connected with this foamed material.

When manufacturing the inventive mass, by mixing the substantially saturated liquid hydrocarbons such as for example polyisobutylene with the unsaturated liquid hydrocarbons, preferably polybutadiene containing OH-groups, and by adding the reactive agent consisting of polyisocyanate a chain growth is achieved with simultaneous cross-linking by means of the cross linking agent, thereby providing in view of the presence of the hollow microspheres, the thin shell of which consists of a vinylidene chloride copolymer, a quasi-foam structure without thereby changing the molecular function of the mass.

BRIEF DESCRIPTION OF THE DRAWING

The sole FIGURE of the drawing shows in a cross section a cushion filled with a mass according to the invention.

SPECIFIC DESCRIPTION

Within a shaped body 1 of polyurethane foam there is provided a recess 2 which is open in direction to one side and which has embedded therein the foamed material 3 according to the invention. Conveniently the shaped body 1 provides the mold when producing the foamed material 3. The recess 2 is covered by a cover layer 4 which, in the embodiment shown, consists of a fur imitation but can also consist of a textile material.

What we claim is:

1. A foamed supporting material which can be used to support a part of the human body comprising a polyaddition reaction and wide-meshed cross-linking reaction product comprised essentially of:
   (a) at least one substantially saturated liquid hydrocarbon;
   (b) at least one hydroxy-terminal unsaturated liquid hydrocarbon;
   (c) a reactive agent reacted with with the unsaturated liquid hydrocarbon;
   (d) cross-linking agent; and
   (e) hollow microspheres having a thin shell consisting of a vinylidene chloride copolymer and containing a gas.

2. Foamed material according to claim 1, wherein the substantially saturated liquid hydrocarbon consists of polyisobutylene.

3. Foamed material according to claim 1, wherein the substantially saturated liquid hydrocarbon consists of low-molecular-weight polyisobutylene having a molecular weight between 500 and 15 000.

4. Foamed material according to claim 1, wherein the substantially saturated liquid hydrocarbon consists of a mineral oil behaving chemically inert against the reactive agent.

5. Foamed material according to claim 1, wherein the ratio of the proportion of substantially saturated hydrocarbons to the proportion of unsaturated hydrocarbons is between 2.5:1 and 1:3.

6. Foamed material according to claim 5, wherein the proportion of substantially saturated hydrocarbons is equal to the proportion of unsaturated hydrocarbons.

7. Foamed material according to claim 1, wherein the unsaturated hydrocarbon consists of polybutadiene.

8. Foamed material according to claim 1, wherein the reactive agent with which the unsaturated liquid hydrocarbons are reacted, consists of polyisocyanate.

9. Foamed material according to claim 1, wherein the cross-linking agent consists of ethylene hexane diol.

10. Foamed material according to claim 1, wherein the hollow microspheres have a diameter between 0.01 and 0.1 mm.

11. Foamed material according to claim 1, in which additionally fillers are provided.

12. Foamed material according to claim 11, in which additionally scents are provided.

13. Foamed material according to claim 11, in which additionally pigments are provided.

14. Foamed material according to claim 11, in which additionally stabilizers are provided.

15. Foamed material according to claim 1, having a composition providing adhesive property to the foamed material.

16. Foamed material according to claim 1, wherein a layer is applied to at least one side of the foamed material.

17. Foamed material according to claim 16, wherein the layer consists of foamed polyethylene.

18. Foamed material according to claim 16, wherein the layer consists of foamed polyurethane.

19. Foamed material according to claim 16, wherein the layer consists of a textile material.

20. Foamed material according to claim 16, wherein the layer consists of a natural fur.

21. Foamed material according to claim 16, wherein the layer consists of an artificial fur.

22. Foamed material according to claim 16, wherein the layer consists of a shoe sole.

23. Foamed material according to claim 1, wherein a foil is applied to at least one side of the foamed material.

24. Foamed material according to claim 23, wherein the foil consists of polyethylene.

25. Foamed material according to claim 1, which is at least partially surrounded by a shaped body.

26. Foamed material according to claim 25, wherein the foamed material is received within at least one recess of the shaped body.

27. Foamed material according to claim 25, wherein the shaped body consists of an elastomeric foam.

28. Foamed material according to claim 27, wherein the shaped body consists of foamed polyurethane.

29. Foamed material according to claim 27, wherein the shaped body consists of foamed polyethylene.

30. Foamed material according to claim 25, wherein the shaped body is formed of a shoe sole.

31. Foamed material according to claim 26, wherein the recesses are arranged at the ball portion and at the heel portion of the shoe sole.

* * * * *